United States Patent [19]

Ewanus et al.

[11] 4,185,241
[45] Jan. 22, 1980

[54] COMMUNICATIONS SYSTEM USING TIME POSITION MODULATION AND CORRELATION SLOPE DEMODULATION

[75] Inventors: Walter Ewanus, Ellicott City; George A. McKay, Laurel, both of Md.

[73] Assignee: Westinghouse Electric Corp., Pittsburgh, Pa.

[21] Appl. No.: 367,659

[22] Filed: Jun. 6, 1973

[51] Int. Cl.² .......................... H04B 7/00; H04K 1/00
[52] U.S. Cl. ........................................ 325/47; 325/32; 325/65; 325/139; 325/145; 325/344; 325/347; 325/473
[58] Field of Search ...................... 325/32, 42, 47, 65, 325/139, 145, 147, 30, 344, 347, 349, 346, 320, 323, 473

[56] References Cited
U.S. PATENT DOCUMENTS

| 3,384,822 | 5/1968 | Miyagi | 325/30 |
| 3,475,558 | 10/1969 | Cahn | 179/15 BA |
| 3,588,747 | 6/1971 | Rusho | 325/139 |
| 3,603,882 | 9/1971 | Wilson | 325/139 |
| 3,644,831 | 2/1972 | Latker et al. | 325/145 |
| 3,706,933 | 12/1972 | Bidell et al. | 325/42 |
| 4,112,368 | 9/1978 | Ewanus et al. | 325/47 |

Primary Examiner—Howard A. Birmiel
Attorney, Agent, or Firm—R. M. Trepp

[57] ABSTRACT

An angle modulation radio communications system having privacy and security characteristics. The system utilizes two or more communication units, one at the transmitting terminal and the other at the receiving terminal of identical functional construction and each having a transceiver module, an antenna and a phase reversal modulator-demodulator module between the transceiver module and the antenna. Complex phase reversal modulation of the transmitted carrier is accomplished which produces a constant amplitude spread spectrum frequency-modulated carrier from which the modulation is not recoverable without a proper code in an autocorrelation process. The modulator-correlator module is bidirectional in operation, and because of its interposition between the antenna and the receiver module, the modulator-correlator spreads the spectrum of any electromagnetic wave signals supplied by it to the transmitting antenna and also spreads the spectrum of any signals received by the antenna not included in accordance with the proper code. Therefore, the units of the system present a very high degree of signal frequency selectivity and rejection of any electromagnetic wave radiation not having the proper code. Pseudo-random code phase reversal modulation suppresses the carrier and the intelligence signal power is in the form of frequency perturbations of the pseudo noise code modulation.

16 Claims, 7 Drawing Figures

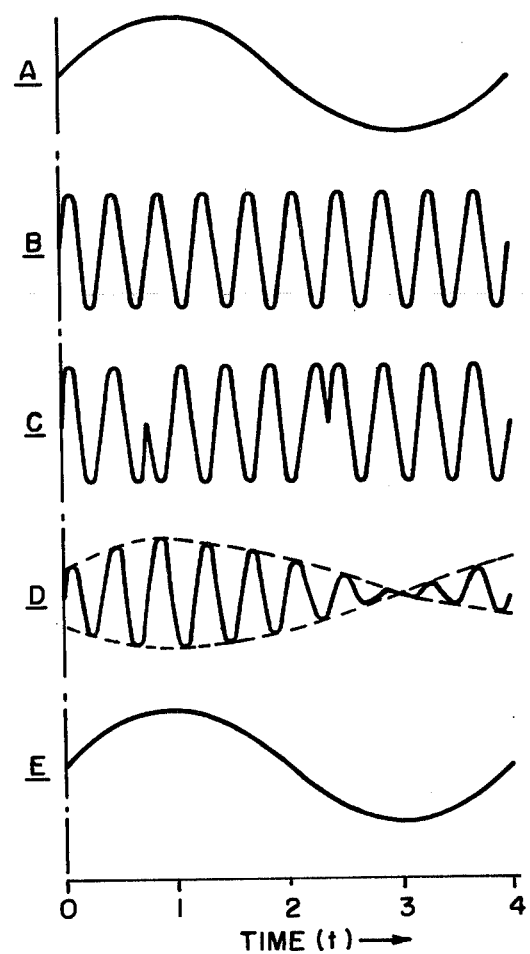
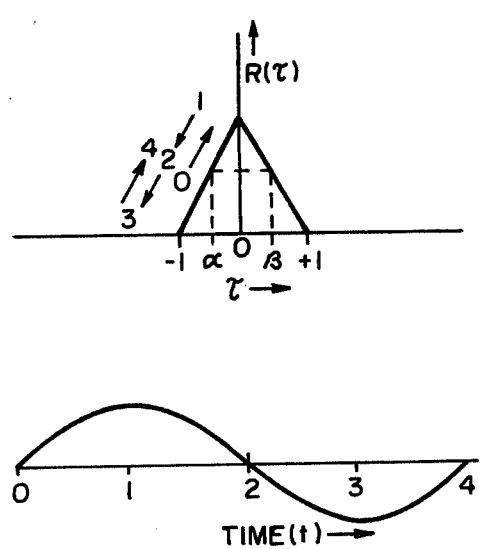
FIG. 3
FIG. 4

TRANSMITTING TERMINAL

RECEIVING TERMINAL

COMMUNICATIONS SYSTEM USING TIME POSITION MODULATION AND CORRELATION SLOPE DEMODULATION

BACKGROUND OF THE INVENTION

This invention relates to a communications system comprising at least two communication units preferably in the form of transceivers, having the same functional characteristics which provide a very high degree of security and privacy. The invention also includes a novel method of secure communications using any apparatus which can accomplish the objectives of the present invention.

In copending application Ser. No. 754,375, filed Aug. 21, 1968 in the name of Walter Ewanus, there is described and claimed a security communications system utilizing at least two communication units having characteristics common to both, such as transceiver components, so that either one can serve as a transmitter or a receiver. In that application, as well as in the present instance, one of the important features is the arrangement of a high speed, bidirectional pseudo-random noise modulator-correlator module between the antenna and the transceiver module. For purposes of simplification, the device heretofore referred to as a modulator-correlator will be called simply a modulator although actually being capable of the dual function as hereinafter outlined. In these systems a pseudo-noise code generator supplies modulation signals to the modulator module when the communication unit is operating in the modulation transmitting mode. The carrier from the transmitter portion of the transceiver is phase coded in the modulator module to produce a very widespread frequency spectrum. A similar modulator module, operating in the correlation, (or receiving) mode between the antenna and the receiver at the receiving unit demodulates the received signal by correlation with the transmitted code. The modulator module of both units will spread the spectrum of any electromagnetic wave signal being received at either of the terminals which is not properly coded so that such signals will be rejected. The modulator module at the transmitting unit, operating in the modulation mode, will spread the spectrum of the propagated carrier wave so that there will be practically no signal power within the aperture of a conventional receiver. This gives antijamming characteristics with a very high degree of rejection of uncorrelated signals. Although the communication units are illustrated by transceiver units, it is obvious that separate transmitter and receiver units may be substituted for the transceiver components.

In the previously mentioned patent application, security and privacy are accomplished to a certain degree by superimposing the intelligence signals directly on the carrier by any type of modulation in which the amplitude of the carrier remains constant, such as in phase, or angle, modulation. However, if AM modulation is used, a conventional AM receiver, which can overcome the processing gain by virtue of its close proximity to the transmitter, can recover the modulating intelligence signals by detecting the amplitude of the pseudo-noise modulated spectrum.

In another copending patent application Ser. No. 54,259 filed July 13, 1970 and assigned to the same assignee as the present application there is described and claimed an improvement over the system described in the previously mentioned patent application in that the invention in Ser. No. 54,259 provides a greater degree of privacy and security by a novel method and means for modulation to provide a constant amplitude spread spectrum carrier from which no intelligence can be recovered without the proper pseudo-random code. The present invention has all the basic advantages of the components in the previously mentioned patent applications in that conventional AM receivers and transmitters can be used and in that the system is such that only the transmitting antenna need have very wide band characteristics to handle the signals. On the other hand, whereas in the prior systems the intelligence can be extracted without the proper code under certain conditions, when the receiver is near enough to the transmitter because there is an AM component on the side bands, in the present invention the side bands do not have any AM intelligence signal components and of course the carrier is suppressed by the phase reversal modulation. In the previously mentioned systems there is an AM signal component on the sidebands and a conventional AM receiver close enough to the transmitting antenna could extract the signal intelligence from the side bands, whereas in the present invention there is no AM signal component on the side bands. Since, in the present invention the signal intelligence is impressed on the carrier in the form of phase modulation, there is no AM signal component on the carrier but by means of the novel modulator/demodulator units of the present invention a conventional AM receiver, when used as a part of the present invention, can extract the signal intelligence from the carrier which signal appears to a conventional AM receiver, not operating in the present system, to be suppressed.

This is one of the salient features of the present invention in that special receiver components are not required to accomplish the advantages of the privacy and security provided by the present system.

The present invention provides a new modulation technique called correlation slope modulation (CSM) which provides a greater degree of privacy over amplitude modulated spread spectrum communication systems, such as those described in the aforementioned patent applications. The unique principle of the present invention is that the relative position in time between the pseudo-noise sequences of the transmitter and receiver is varied in accordance with the amplitude of the intelligence signal source. The resulting transmission is then constant amplitude carrier which is converted to the conventional AM only through correlation at the receiver terminal.

SUMMARY OF THE INVENTION

In its broadest aspect, the present invention provides a communications system of the general type of those of the previously mentioned patent applications, including two or more communication units each capable of serving in either a transmit or a receive mode. Each unit comprises a transceiver unit each including an antenna and a modulator module interposed between the transceiver module and the antenna and an intelligence modulated code generator GT, serving as a signal source for driving the modulator. The conventional amplitude modulated transceiver communication units are adapted for use in the present system by the addition of the modulator module and the components for operating the pseudo-noise generator coder in accordance with the present invention as outlined hereinafter. When the transceiver module is operating in the receiving mode the modulator operates as a correlator as pointed out in greater detail later. The correlation slope modulation technique is best explained by describing its implementation which is diagrammatically illustrated in FIGS. 1 and 2. It will be noted that in FIG. 2 the transceiver supplies a carrier signal to the spectrum-spreading modulator module, which is particularly designed to provide the correlation slope modulation and the output of this modulator module is supplied to the antenna system from which it is radiated. The exact same system is provided at the receiver end. As will be pointed out hereinafter during the transmitting mode certain components of the communication unit at the transmitter end operate while certain of the components at the receiver end do not operate, and vice versa.

There are two embodiments of this invention, namely, the single slope modulator and the double slope modulator.

A cursory understanding of the similarities and differences between the two embodiments can be obtained from the first six figures of the accompanying drawings.

BRIEF DESCRIPTION OF THE DRAWINGS

FIG. 3 is a series of graphs representing the waveforms of signals at corresponding points indicated on the block diagram of FIG. 2;

FIG. 4 graphically presents the relation between the autocorrelation function of the pseudo-noise modulation and the audio intelligence signal voltage for the first embodiment of FIG. 2;

DESCRIPTION OF THE PREFERRED EMBODIMENT

Figure 1:
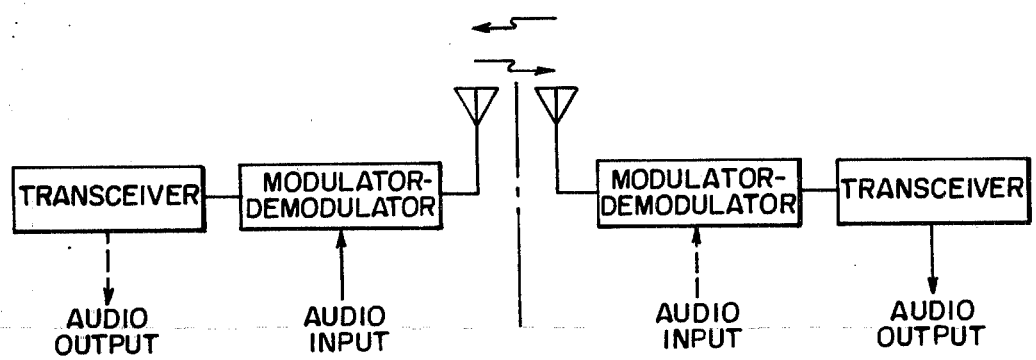
FIG. 1 graphically depicts the basic philosophy of the present invention by illustrating that there is a basic component, namely, a modulator/demodulator, between the transceiver and the antenna of each communication unit which serves the dual function of: (1) a modulator when the transceiver is operating as a transmitter, and (2) of a correlator when the transceiver is operating as a receiver.
Figure 2:
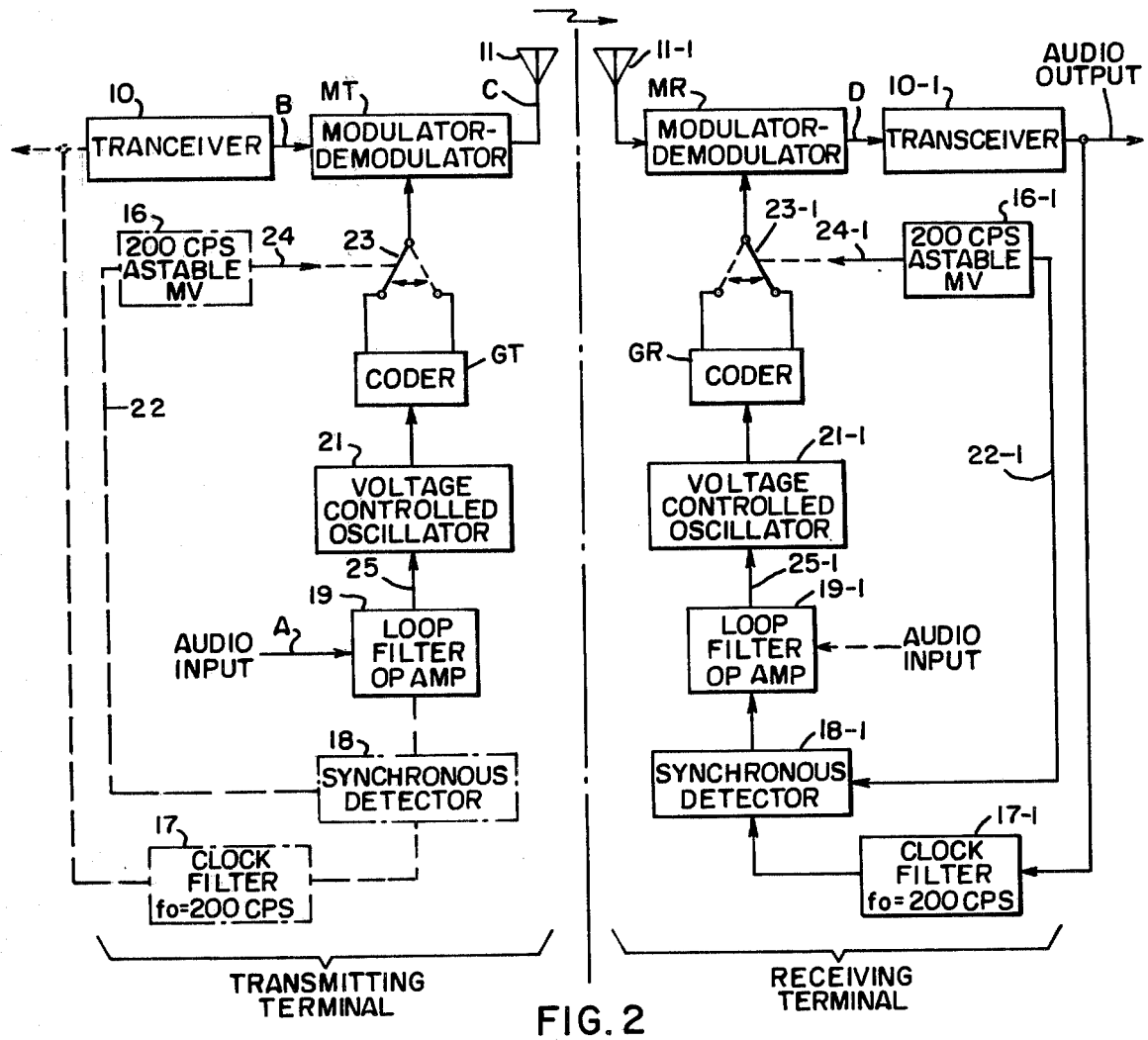
FIG. 2 is a block diagram of one embodiment, namely, the single correlation slope modulation system of the present invention.

The simplest implementation of the present invention is represented by the first embodiment illustrated in FIG. 2, that is, the single correlation slope modulation system. The most significant feature that distinguishes the present invention from the systems of the aforementioned patent applications is that there is no AM modulation of the carrier, and therefore no AM modulation of the side bands which can be detected by a receiver not utilizing the proper correlation code. Although the environment in which the novel technique of the present invention operates is the same as that described in the aforementioned patent applications, the prior devices modulated the carrier in such a manner that there was at least a vestigial amplitude component of the intelligence modulation of the radiated carrier.

A conventional AM receiver can respond to such a signal, providing that the signal power is a least high enough to overcome the processing gain.

In the present invention there is not even a vestigial component of amplitude modulation in signals radiated because the intelligence is buried in the relative spacing of the code components of the radiated signals. In other words, the varying quanta which carries the intelligence is the phase angle variations between the transmitted code sequence and the received code sequence, this variation corresponding to variations in the relative time and space positions of the code sequence.

This may be visualized as a phase velocity superimposed on the code sequence which is a train of pulses, which in the space domain moves, as a group, at the velocity of light. The average phase velocity is the same as the speed of light with respect to space, but the superimposed space velocity wave oscillates back and forth with respect to the pulse train as the radiated energy proceeds to the receiver at the velocity of light. The instantaneous phase velocity of the different components of the code at the receiver end effectively modulates the output at the receiver and gives the same effect, as far as the reception is concerned, as AM modulation, while at the same time the carrier wave amplitude remains absolutely constant. There is no AM modulation of the transmitted carrier; there are merely phase perturbations in the components of the code sequence.

The environment in which the novel technique of the invention is set is basically the same as that described in the aforementioned patent applications. As previously indicated, the two units shown in FIG. 2 are identical, both being able to transmit the coded signal which the other unit is capable of decoding and recovering the original intelligence transmitted from the transmitter terminal unit. It must be understood, however, that when one of the units is operating as a transmitter only those components of the unit which take place in the transmission operate while at the receiver terminal at the same time while only those components which are involved in the decoding operation come into operation.

Referring more specifically to FIG. 2, the transceiver 10 is a UHF voice transceiver operating in the transmitting mode. The RF output from the transceiver 10 is a phase-reversal modulated by a pseudo-noise code sequence generated by the coder GT and supplied to the modulator MT where the carrier output from the transceiver 10 is modulated, thus producing a spread spectrum signal which is in turn supplied to the antenna 11. The spread spectrum radiated from the antenna is a constant amplitude carrier at a constant average frequency but with aperiodic cycles with the deviation from periodicity being a function of the amplitude of the audio input signal. This is not easy to illustrate graphically without the use of oscillograph pictures. The important thing is that there is neither an AM component nor an FM component on the carrier or sidebands that can be detected by a conventional receiver.

The spread spectrum carrier radiated from the transmitting antenna 11 is received by the receiving terminal antenna 11-1 and is compressed (correlated) in the phase demodulator MR when the latter is phase modulated by the pseudo-noise sequence from the coder GR in a manner outlined in greater detail hereinafter, to reconstruct a conventional amplitude modulated carrier (FIG. 3D).

Simple graphical illustration of the above is presented in the graphs of FIG. 3 representing the general wave form of the signals at the corresponding points in the circuit diagram of FIG. 2 for the single slope correlation slope modulation embodiment, where for purposes of simplification the intelligence signal input is represented as a pure sine wave. The graphs are related to units on a time scale for purposes of later explanation.

Voltage controlled oscillator 21 is responsive to the audio input at A in such a manner that an increase of the instantaneous amplitude of the audio waveform causes an increase in the frequency of the oscillator. Each cycle of the voltage controlled oscillator output causes one digit to be produced out of the coder GT, and this amounts to an effective shifting forward of the transmitted aperiodic code sequence in time with respect to cycles of a periodic sequence of the same average frequency. The transmitted carrier, represented in graph C of FIG. 3, is of constant amplitude with phase-reversal modulation plus time position modulation superimposed upon the phase-reversal modulation, but not illustrated in the graph. Time scales of the audio, RF and the phase reversal wave forms in FIG. 3 are distorted and therefore portray only the general concept of the signals.

The coder GR tracks only the average time position of the coder GT sequence and it lags the coder GT average position by one-half bit. Coder GR does not correspond to changes in time position by the coder GT sequence fluctuation at audio rates. Therefore, the coder GT sequence fluctuates back and forth next to the position in time of the coder GR sequence at an audio rate. This time position modulation causes the waveform of the signals out of phase modulator MR to appear as shown in curve D of FIG. 3. The transceiver 10-1 in the receiving unit then performs conventional AM detection on the waveform D and produces the desired output audio waveform represented by the curve E of FIG. 3, which is a reproduction of the input audio waveform A. The detailed description of how the coder GT is made to track the coder GR for the correlation slope modulation in accordance with the two embodiments in this invention is described in greater detail hereinafter.

In general, the time position modulation as performed on the coder GT is made to track the coder GR for the correlation slope modulation in accordance with the two embodiments in this invention is described in greater detail hereinafter.

In general, the time position modulation is performed on the coder GT sequence by choosing the sequence from the coder GR to be the reference position in time. When the audio input voltage is at zero volts, the code sequence from the coder GT will be one-half bit behind the coder GR sequence. Since the coder sequences are pseudo-noise sequences, the output of the phase modulator MR in the receiver will be zero whenever the transmitter coder GT sequence is one bit ahead of, or behind, coder GR, which is the same thing as saying that the sequences are uncorrelated. However, when coder GT is within a small fraction of a bit of exact time synchronism with coder GR, the output sine wave envelope of phase modulator MR in the receiver, represented by the curve D in FIG. 3 is to say that the sequences are correlated.

As mentioned previously, the sequence from the receiving coder GR is chosen to be the reference position in time. Since the audio input voltage is applied to cause the transmitting oder GT to deviate, or vary, from this time position reference between the outer limits of correlation and no correlation, that is, within one bit ahead and one bit behind the receiving coder GR sequence, by a time displacement or deviation inversely proportional to the amplitude of the audio input voltage. This is what converts the transmitted complex constant amplitude carrier, represented by the graph C of FIG. 3, to the A.M. modulated RF signal at the output of the receiving modulator MR on which the conventional transceiver 10-1 performs conventional detection.

In accomplishing the extraction of the intelligence by the conventional AM transceiver 10-1 from the time position modulated carrier transmitted from the transceiver 10 an astable multivibrator 16 switches the outputs of two adjacent stages of coder GR alternately to the phase modulator MR at a selected rate, for example at 200 Cps. This causes the polarity of the audio voltage to be inverted at the same rate as it is applied to the modulator MR. When the audio voltage as delivered from the receiving terminal antenna 11-1 is zero volts the received coder sequence from coder GT will be one-half behind the coder sequence GR. If the coder GR begins to move away from proper position in time, the superimposed 200 Cps. amplitude modulation rate becomes superimposed on the audio signal supplied to the transceiver 10-1. The 200 Cps. AM modulation is filtered out by a clock pulse filter 17-1 and the audio modulation is synchronously detected by the synchronous detector 18-1. The detected audio voltage is supplied through the loop filter and operational amplifier 19-1 to the voltage controlled oscillator 21-1. The output of the oscillator 21-1 is supplied as a clock to coder GR. The output of the 200 Cps. multivibrator 16-1 is supplied to the synchronous detector 18-1 over conductor 22-1 and to a suitable switch 23-1 over conductor 24-1 to alternately switch the previously mentioned two adjacent stages of coder GR to the modulator MR. It must be understood that the other components mentioned above are connected electrically by means of the different conductors shown in FIG. 2.

The frequency output from the VCO 21-1 is either advanced or retarded, depending upon which direction the frequency of the VCO 21-1 must be changed to reduce the synchronization error between coders GR and GT. The magnitude of the voltage on conductor 25, representing the control voltage for the oscillator, is directly proportional to the error in time position between sequences from the coders up to $\pm 0.5$ bit. The two graphs of FIG. 4 indicate the time relation between coder sequences and the audio wave form, the latter assumed for convenience to be a sine wave. The two graphs are centered on a point in time. the upper graph being an autocorrelation function of the coder sequences and the lower graph representing a full cycle of audio voltage. In the upper graph the ordinate R ($\tau$) represents the output of the phase modulator MR and $\tau$ represents the time position deviation from correlation. The time scale representing instants of time from t=0 out to t=4 applies to both graphs.

Another way to explain how the waveforms of the reconstructed audio signal of curve D in FIG. 3 and the lower graph in FIG. 4 is to examine the autocorrelation function of the pseudo-noise sequence mathematically. The autocorrelation function of the code sequence X(T) is defined as $$R(\tau) = \int_{-\infty}^{+\infty} X(t)X(t-\tau)dt$$

where R and $\tau$ are defined as above. The function indicates the amplitude of the output of the phase modulator MR as a function of time.

It can be seen then that linear modulation, $R(\tau)$ $\alpha$E sin $\omega_m$, is accomplished by virtue of time position modulation between the extremities of full correlation, R ($\tau$)=1.0 and R ($\tau$)=0.0. The effect is more precisely defined by the expression:

$R(r) = \frac{1}{2} 1 \pm E \sin \omega_m t$)
where $E \leq 1.0$ and $\omega$=modulating frequency.

The discussion above is primarily directed to the right hand side of FIG. 3 acting as the receiving terminal but it is to be understood that the units at the transmitting and receiving terminals are identical.

Figure 5:
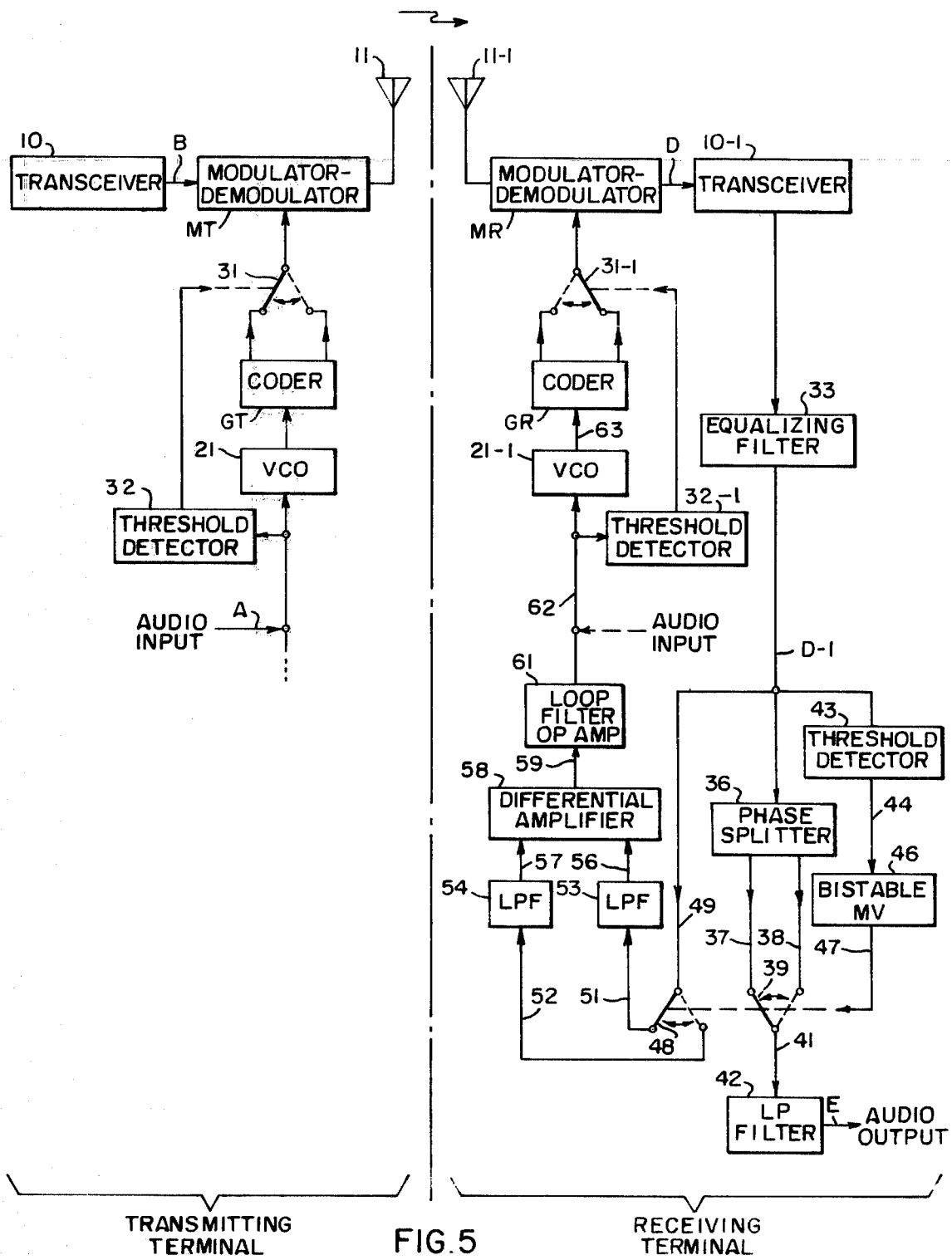
FIG. 5 is a block circuit diagram of the second embodiment, namely, the double correlation slope modulation system.

The correlation slope modulation technique of the present invention can be implemented in a second embodiment in the form of double slope modulation which is basically the same as the first embodiment but provides a 6 DB better output signal-to-noise ratio. The block circuit diagram of this embodiment is represented in FIG. 5.

As in the first embodiment the coder sequence at the receiving terminal serves as the reference point in time. Whereas in that embodiment a multivibrator at the receiving terminal switches adjacent states of the receiving terminal coder at a selected rate and supplies the output to the phase modulator to modulate the received signals to produce audio voltage polarity inversions at that switching rate, in the present embodiment a polarity sensitive threshold detector at the transmitting terminal senses zero crossing of the audio signal input voltage at the transmitter and alternately switches the outputs of adjacent coder stages to the phase modulator at that terminal. The receiving terminal is suitably modified to process the transmitted carrier signals.

It is to be understood that the communication unit at the transmitting terminal and that at the receiving terminal are identical, as before, although the description of the operation of the system entails only some of the components at the transmitting terminal.

Figure 6:
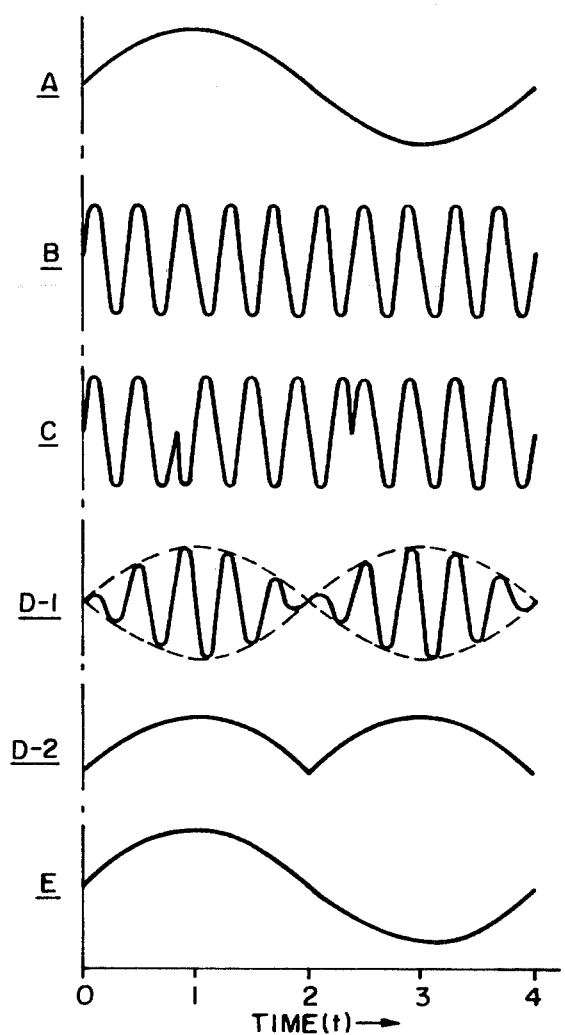
FIG. 6 is a series of graphs representing the waveforms of signals at corresponding points indicated on the block diagram of FIG. 5.
Figure 7:
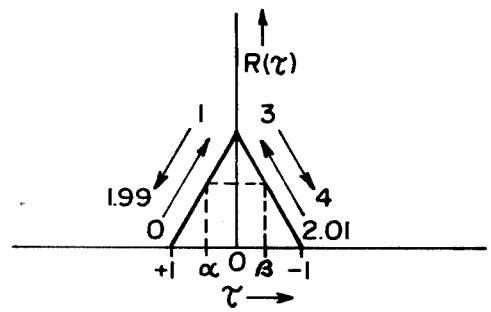
FIG. 7 graphically presents the relation between the autocorrelation function of the pseudo-noise sequence modulation and the audio intelligence signal voltage for the second embodiment in FIG. 5.
Figure 7:
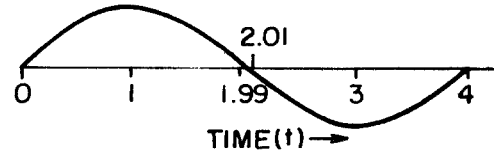

In greater detail, in the operation of the double correlation slope modulation embodiment reference is made to FIGS. 6, 7, and 8.

Simple graphical illustration of the embodiment is presented by graphs of FIG. 7, similar to those of FIG. 3 for the first embodiment, representing the general waveform of the signals at corresponding points on the circuit diagram of FIG. 5. A significant difference is the addition of curve D-2, to which further reference will be made later. For purposes of simplification, the audio input signal is assumed to be a sine wave.

The audio input signal is applied at the point A through the conductor to the voltage controlled oscillator 21 and the oscillator is so adjusted that at zero voltage the coder sequence output voltage from the coder GT applied through the conductor and switch 31 to the phase modulator MT is one bit behind the code sequence of coder GR. When the instantaneous voltage of the audio input increases to its peak positive value, the coder sequence received over antenna 11-1 at the receiving terminal and applied to the phase modulator MR is within a small fraction of a bit behind the coder sequence of coder GR applied through the switch 31-1 to the modulator MR. When the instantaneous value of the audio voltage returns toward zero, the sequence received by the modulator MR lags until it is a full bit behind the coder GR sequence. When the instantaneous value of the audio input voltage passes through zero going negative, threshold detector 32, a conventional Schmitt trigger, is tripped so that the code sequence applied to phase modulator MT is the output of, for example, stage "n+2" of coder GT instead of stage number "n". In other words, as soon as the instantaneous value of the audio input voltage goes negative, the coder GT sequence is one full bit ahead of the coder GR sequence but it is moving toward synchronism with the coder GR sequence.

This sequence of events, as represented graphically in FIG. 7 explains how waveform D-1 of FIG. 6 is obtained. It should be noted that the output of phase modulator MR on the conductor at point D looks very similar to double sideband, suppressed carrier amplitude modulated signals. The audio output from the transceiver 10-1 is waveform D-2 of FIG. 6. Because the waveform D-2 contains the original audio input waveform and harmonics of it, the frequency response of the audio output from transceiver 10-1 must be extended by an equalizing filter 33. For practical purposes, the characteristics of the filter may be selected to extend the upper half power point of the frequency from 4 K hz to 8 K hz.

The output of the equalizing filter 33 is supplied over conductor 34 to a phase splitter 36, or phase inverter, to provide the wave form D-2 of FIG. 6 in two polarities which is supplied over conductors 37 and 38 and s switch 39 and conductor 41 to a low pass filter 42.

The output of the filter 33 is also supplied to an amplitude voltage sensitive threshold detector 43, which is a conventional Schmitt trigger, and the output of which is supplied over conductor 44 to a bistable multivibrator 46. The multivibrator 46 output over conductor 47 operates switch 39. The threshold detector 43 is so adjusted that it is tripped every time the amplitude of waveform D-2 of FIG. 6 exceeds a selected level, such as slightly more positive than the noise level to minimize false decisions. The bistable multivibrator 46 then divides this count by two so that every other half-cycle of waveform D-2 is inverted.

The output of the MV 46 on conductor 47 operates the switch 39 to selectively connect conductors 37 and 38 to conductor 41 and thereby supply the output of phase splitter 36 to the low pass filter 42. The output of filter 42 on the conductor at E is the reconstructed audio output, corresponding to the output in the first embodiment and represented by the sine wave in graph E of FIG. 6.

In order to maintain the necessary correlation between the code sequences at the transmitting and receiving terminals in order to extract the audio intelligence at E, the output of the MV 46 on conductor 47, in addition to controlling the switch 39, also synchronously operates switch 48 which alternately connects the output of the filter 33 on conductor 49 to conductors 51 and 52. This causes every other half-cycle of the half-wave rectified output of the equalizing filter 33 to be supplied into one of two parallel low pass filters 53 and 54. The outputs of these filters are supplied over conductors 56 and 57, respectively, to a differential amplifier 58.

The slowly varying D.C. voltage output of one LPF filter, such as that on conductor 56 from filter 53, is representative of the amplitude of the peak R. F. input voltage into transceiver 10-1 during one-half of an audio waveform cycle. Likewise, the D.C. output of the filter 54 on conductor 56 represents the amplitude of the peak R. F. input voltage into transceiver 10-1 during the other hal cycle of each audio waveform. The output of the differential amplifier 58 is supplied over a conductor 59 to a loop filter and operational amplifier 61 the output of which is supplied over conductor 62 to the voltage controlled oscillator 21. (If this unit was operating as a transmitting terminal, the original audio input voltage would be supplied at this point.) The output of the VCO 21-1 is supplied over conductor 63.

When coder GR is tracking properly the peak RF amplitude during each audio half-cycle will be almost equal in amplitude to the peak R. F. amplitude during the audio half-cycle immediately before and after the current audio half-cycle. Therefore, when coder GR is tracking the coder GT the outputs of the two low pass filters 53 and 54 are equal in amplitude, the output of the differential amplifier 58 is zero and the VCO 21 is maintained at its current frequency. However, when coder GR appears to be forward or backward in time from its correct position, the output of the differential amplifier 58 is positive or negative, depending upon the direction of time error, to correct the frequency of VCO 21. The output voltage on conductor 59 has magnitude proportional to coder GR time error of up to ±1.0 bit.

The graphs of FIG. 7 illustrate the correlation operation of the second embodiment in FIG. 5 in a manner similar to that in which the graphs of FIG. 4 illustrate the operation of the first embodiment in FIG. 2.

What is claimed is:

1. In a signaling system
   (a) means for generating a carrier wave,
   (b) means for generating code signals,
   (c) phase modulating means connected to the output of said carrier wave generating means,
   (d) said modulating means being connected to and driven by said code generator for phase-modulating said carrier wave,
   (e) a voltage controlled oscillator for driving said code generator, and
   (f) means connected to said oscillator for varying the phase of said oscillator in accordance with the amplitude of intelligence signals.

2. The combination as set forth in claim 1 in which said phase modulation means is phase-reversal modulation means.

3. The combination as set forth in claim 1 in which said code generator generates a pseudo-noise code sequence of signals.

4. The combination as set forth in claim 2 in which said code generator generates a pseudo-noise code sequence of signals.

5. A signaling system including, the combination as set forth in claim 1, and further comprising:
   (a) a receiving terminal unit having a demodulating component, a rectifying component and a code generator,
   (b) a voltage controlled oscillator for triggering said code generator, to generate comparison signals, and
   (c) a phase modulator.

6. in a signaling system
   (a) means for generating a carrier wave,
   (b) means for generating a pseudo noise sequence, said sequence having an average frequency,
   (c) means for phase modulating said carrier wave with said pseudo noise sequence,
   (d) means for time position modulating said pseudo noise sequence in accordance with intelligence signals,
   (e) said time position modulation consists of variations in the relative time and space positions of said pseudo noise sequence with respect to cycles of a periodic sequence of the said average frequency.

7. The combination as set forth in claim 6 in which said phase modulation is phase-reversal modulation.

8. The combination as set forth in claim 6 in which said time-position modulation is a function of the amplitude of audio intelligence input signals.

9. The combination as set forth in claim 6 in which said phase modulation is phase reversal modulation and said time-position modulation is a function of the amplitude of audio intelligence signals.

10. In a communication system comprising communication units at the transmitting terminal and at the receiving terminal, said units further comprising
    (a) means for generating a carrier wave,
    (b) means for generating a code sequence,
    (c) means connected to said code generating means and responsive to intelligence input signals for modulating the generated code sequence in accordance with the amplitude of said intelligence signals,
    (d) means for phase modulating said carrier wave,
    (e) means between, and connected to, said code generating means and said phase modulator for modulating said code sequence as applied to said phase modulator to thereby provide a constant amplitude spread spectrum carrier whose signal varies in the time position domain and not in the carrier amplitude domain,
    (f) the code sequence generated by said code generator at the receiving terminal serving as the reference position in time,
    (g) the phase modulator at the receiving terminal being phase modulated by the code generator at the receiving terminal and serving to compress the received spread spectrum carrier by correlation between the code sequences at the transmitting and receiving terminals, and thereby convert the time-position modulation on the received RF signal to AM modulation, and
    (h) means for detecting and reconstructing the audio intelligence modulation.

11. The combination as set forth in claim 10 and including
    (A) a first correlation slope modulation servoloop including:
       (a) said detecting means,
       (b) a clock pulse filter connected to the output of said detecting means,
       (c) a synchronous detector for detecting clock pulses,
       (d) a filter and operational amplifier connected to the output of said synchronous detector,
       (e) a voltage controlled oscillator connected to the output of said amplifier,
       (f) said code generating means connected to the output of said oscillator
       (g) said means between said code generating means and said phase modulator, (h) said phase modulator, and
(i) said intelligence detector, and
(B) a second correlation slope modulation servo-loop, for modifying the operation of said first servo-loop, including:
(a') a clock pulse generator,
(b') said synchronous detector,
(c') said loop filter and operational amplifier,
(d') said voltage-controlled oscillator,
(e') said code generating means, and
(f') said means for modulating the code sequence as applied to said phase modulator.

12. The combination as set forth in claim 10, in which said means between said code generator and said modulator is varied as a function of the polarity of the intelligence signals.

13. The combination as set forth in claim 10, in which the phase modulator is so modulated as to produce an AM modulated RF carrier envelope which contains signal power which is the equivalent of a modulated double sideband suppressed carrier wave.

14. The combination as set forth in claim 13 in which the means for detecting and reconstructing the intelligence modulation includes an equalizing filter, a phase splitter and inverter and a low pass filter.

15. The combination as set forth in claim 14 in which a double slope correlation demodulation servo-loop includes
(a) a phase demodulator which is so modulated as to compress the phase-reversal, time-position modulated spread spectrum RF carrier,
(b) an Rf detector component,
(c) an equalizing filter,
(d) two parallel branch low pass filters connected to
(e) a differential amplifier, the output of which is supplied through
(f) a loop filter operational amplifier to
(g) a voltage controlled oscillator controlling
(h) a code sequence generator, the output of which is alternately connected to said phase modulator (a) above through
(i) a switch
(j) controlled by a polarity sensitive switch which is in turn connected to and controlled by the output of said loop filter operational amplifier (f) above.

16. The combination as set forth in claim 15 in which the two parallel branch circuits of said servo-loop are alternately connected to the output of said equalizing filter by a switch controlled by a bistable oscillator which is controlled by the output of a voltage sensitive threshold detector in response to the output of said equalizing filter.

* * * * *